US000001405H

United States Statutory Invention Registration [19]

[11] Reg. Number: H1405

Pottick et al.

[43] Published: Jan. 3, 1995

[54] EPOXY RESIN COMPOSITION

[75] Inventors: Lorelle A. Pottick, Houston; Michael J. Modic, Richmond, both of Tex.

[73] Assignee: Shell Oil Company, Houston, Tex.

[21] Appl. No.: 865,511

[22] Filed: Apr. 9, 1992

[51] Int. Cl.[6] ..... C08L 53/00; C08G 63/48

[52] U.S. Cl. ..... 525/92; 525/65

[58] Field of Search ..... 523/423, 436, 414, 420, 523/421

[56] References Cited

U.S. PATENT DOCUMENTS

| | | | |
|---|---|---|---|
| Re. 27,145 | 6/1971 | Jones | 260/880 |
| 2,450,940 | 10/1948 | Cowan et al. | 260/404.5 |
| 2,633,458 | 3/1953 | Shokal | 260/45.2 |
| 3,336,241 | 8/1967 | Shokal | 260/2 |
| 3,494,942 | 2/1970 | Miki et al. | 260/397.5 |
| 3,496,250 | 2/1970 | Czerwinski | 260/836 |
| 3,634,549 | 1/1972 | Shaw et al. | 260/880 B |

(List continued on next page.)

FOREIGN PATENT DOCUMENTS

| | | |
|---|---|---|
| 78527 | 11/1983 | European Pat. Off. . |
| 254523 | 1/1988 | European Pat. Off. . |
| 0322977-A2 | 7/1989 | European Pat. Off. . |
| 0437297-A2 | 7/1991 | European Pat. Off. . |
| 0449359-A2 | 10/1991 | European Pat. Off. . |
| 3920332-A1 | 12/1989 | Germany . |
| 77020491 | 8/1967 | Japan . |
| 49097036 | 12/1972 | Japan . |
| 49-97036 | 9/1974 | Japan . |
| 56-115346 | 2/1980 | Japan . |
| 57-115446 | 1/1981 | Japan . |
| 58002336 | 6/1981 | Japan . |
| 58040350 | 9/1981 | Japan . |
| 57-149369 | 9/1982 | Japan . |
| 58-17160 | 2/1983 | Japan . |
| 62-197416A | 2/1986 | Japan . |
| 63-308027A | 6/1987 | Japan . |
| 63-308027 | 12/1988 | Japan . |
| 2031909A | 4/1980 | United Kingdom . |
| 2108976A | 5/1983 | United Kingdom . |
| 2238313-A | 5/1991 | United Kingdom . |
| WO87/00188 | 1/1987 | WIPO . |

OTHER PUBLICATIONS

B. M. Walker, *Handbook of Thermoplastic Elastomers*, Van Nostrand Reinhold Co., 1979, pp. 92–94.

*Primary Examiner*—Shean Wu

[57] ABSTRACT

According to this invention, an epoxy resin composition is provided with a finely dispersed phase of an elastomeric block copolymer having at least one block of a hydrogenated conjugated diene connected to at least one block of a carboxylated monoalkenyl aromatic hydrocarbon. The block copolymers are dispersed in the epoxy resin by emulsifying the carboxylated block copolymer and blending the emulsion with the epoxy resin. The block copolymer is emulsified from a relatively non-polar solvent such as tetrahydrofuran using gradual addition of a polar solvent such as water or an alcohol. The dispersed rubber particles have an average diameter between 0.05 and 0.20 microns.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | |
|---|---|---|---|
| 3,670,054 | 6/1972 | De La Mare et al. | 260/880 B |
| 3,673,274 | 6/1972 | Tomalia et al. | 260/836 |
| 3,700,633 | 10/1972 | Wald et al. | 260/880 B |
| 3,804,735 | 4/1974 | Radlove et al. | 204/159.23 |
| 3,892,819 | 7/1975 | Najvar | 260/836 |
| 3,948,698 | 4/1976 | Elrick et al. | 149/19.6 |
| 3,976,628 | 8/1976 | Halasa et al. | 526/21 |
| 3,988,275 | 10/1976 | Satake et al. | 524/274 |
| 4,014,771 | 3/1977 | Rosenkranz et al. | 204/159.23 |
| 4,119,609 | 10/1978 | Allen et al. | 528/99 |
| 4,145,298 | 3/1979 | Trepka | 260/880 R |
| 4,199,490 | 4/1980 | Kamiya et al. | 524/505 |
| 4,251,415 | 2/1981 | Nakada et al. | 260/29.7 N R |
| 4,429,076 | 1/1984 | Saito et al. | 525/92 |
| 4,431,782 | 2/1984 | Harris et al. | 525/531 |
| 4,463,134 | 7/1984 | Hino et al. | 525/109 |
| 4,707,529 | 11/1987 | Hoffman et al. | 525/476 |
| 4,734,468 | 3/1988 | Marx | 525/524 |
| 4,778,851 | 10/1988 | Henton et al. | 525/65 |
| 4,786,668 | 11/1988 | Dewhirst | 523/445 |
| 4,789,712 | 12/1988 | Hoffman et al. | 525/528 |
| 4,820,768 | 4/1989 | Shiraki et al. | 525/92 |
| 4,846,905 | 7/1989 | Tarbutton et al. | 525/65 |
| 5,115,019 | 5/1992 | Marx et al. | 525/65 |

EPOXY RESIN COMPOSITION

FIELD OF THE INVENTION

This invention relates to epoxy compositions toughened by incorporation of a dispersed phase of functionalized elastomeric block copolymers and to methods for preparing this composition.

BACKGROUND

Epoxy resins have a spectrum of properties that are well adapted for use in molding compositions, coatings, adhesives, fiber reinforced laminates, composites, engineering plastics and various speciality applications such as potting resins and mortar. Included in this spectrum of properties are good corrosion and solvent resistance, good adhesion, good electrical properties, good dimensional stability, hardness, low shrinkage on cure and many other beneficial properties. Unfortunately, epoxy resins are brittle.

Several attempts have been made to produce an epoxy resin composition having the desirable epoxy resin properties and reduced brittleness. Early attempts to accomplish this objective involved dissolving a reactive liquid polymer such as a carboxyl-terminated butadiene-acrylonitrile copolymer into an epoxy prepolymer as discussed in the background sections of U.S. Pat. No. 4,707,529 and Japanese Patent (Kokai) No. SHO 58[1983]-17160. Incorporation of the reactive liquid polymer leads to the formation of discrete elastomer particles or domains which toughened the cured epoxy resin. However, the resulting composition will exhibit a lower softening temperature and a lower glass transition temperature than the unmodified epoxy resin. While improved mechanical properties, particularly toughness, are generally obtained, it is difficult to control the extent and consistency of the improvement. This is primarily due to the difficulty of controlling the morphology of this particular composition.

Another attempt to improve the toughness of polyepoxides with liquid polymers involves incorporating liquid acrylate rubbers into epoxy resin compositions. Such compositions are the subject of European Patent Application No. 78,527. However, the acrylate rubbers are generally soluble in the polyepoxide continuous phase at temperatures above about 51° C. and in some cases even at room temperature. As a result, undesirable softening of the cured epoxy resin composition can readily occur. Also, the polymeric phases do not separate until the epoxy cures, and the dissolving and reprecipitation of these phases are sensitive to the manner in which the curing takes place. It is therefore difficult to control the size of the particles of the dispersed modifying phase, and hence, the morphology of the cured composition.

Another attempt to improve polyepoxide compositions involved the incorporation of a normally solid, selectively hydrogenated, modified block copolymer in the composition as taught by Japanese Patent 58-17160. The block copolymer contained at least one vinyl aromatic polymer block (styrene) and at least one hydrogenated conjugated diolefin polymer block (butadiene). The polymer was modified by grafting dicarboxylic acid or carboxylic acid derivative (e.g. anhydride) functionality into butadiene blocks. Functionalization of the styrene-butadiene block copolymers in the butadiene blocks increases the compatibility of the functionalized block copolymer with the epoxy resin, and therefore results in a more stable suspension of block copolymer particles before curing. Applicant has found that these compositions have, after curing, excellent toughness and retain favorable properties of the cured epoxies, but suffer from the disadvantage of being extremely difficult to mold and handle when the amount of rubber incorporated in the composition exceeds about 10% by weight. It is desirable to have an epoxy resin elastomeric block copolymer composition with lower viscosity at the high shear rates found in epoxy resin processing equipment.

A styrene-butadiene block copolymer toughened epoxy resin composition with block copolymer particle sizes within the range of 0.05 to 20 microns is taught in Japanese Patent Application 63-308,027. Small particle sizes are obtained by dissolving the block copolymer and epoxy in a co-solvent and then evaporating the co-solvent. Functionalization of the block copolymer is taught to be optional. The examples of the invention all include block copolymers functionalized by grafting an alpha-beta unsaturated carboxylic acid anhydride to selectively hydrogenated block copolymers. Functionalization of vinyl aromatic-conjugated diolefin block copolymers by this process is known to incorporate the functionality predominantly in the conjugated diolefin blocks. Applicant has found that solution blending styrene-butadiene block copolymers which have been functionalized by this process results in small particle sizes, but the particles have a wide range of sizes and the rate at which the solvent is removed has a large effect on the size and shape of particles in the epoxy resin composition. Further, at block copolymer loadings above 10%, the epoxy resin compositions containing butadiene block functionality generally have a high shear viscosity which is too high to permit processing by normal epoxy resin processing means.

U.S. Pat. No. 4,778,851 describes epoxy compositions having dispersed shell-core elastomers produced by emulsion polymerization of a crosslinked conjugated diene to which is grafted a shell of a functionalized polymer. The "shells" are said to stabilize the rubbery particles in the epoxy resin composition, and upon curing of the epoxy to react with the epoxy to co-cure the rubbery particles into the resin phase. The grafting of the shell onto the core is a time-consuming polymerization which requires careful control, and the uniformity of the resultant rubber particles within the cured epoxy resin is dependent upon providing a latex of crosslinked rubbery particles of uniform size. Additionally, a stabilizer such as sodium dodecylbenzene sulfonate soap is required to stabilize the rubber particles prior to grafting the "shell". These stabilizers can be undesirable impurities in the finished epoxy resin composition. A process without these drawbacks is desirable.

SUMMARY OF THE INVENTION

According to this invention, an epoxy resin composition is provided with a finely dispersed phase of an elastomeric block copolymer having at least one block of a hydrogenated conjugated diene connected to at least one block of a carboxylated monoalkenyl aromatic hydrocarbon. The block copolymers are dispersed by emulsifying the carboxylated block copolymer and blending the emulsion with an epoxy resin. The block copolymer is precipitated from a relatively non-polar solvent such as tetrahydrofuran using gradual addition of a polar solvent such as water or an alcohol. The dispersed rubber particles have an average diameter between 0.05 and 0.20 microns.

DETAILED DESCRIPTION OF THE INVENTION

The epoxy resin compositions of the present invention comprise 100 parts by weight of an epoxy resin and from about 1 to about 50 parts by weight of a block copolymer having at least one selectively carboxylated block of a monalkenyl aromatic hydrocarbon connected to at least one selectively hydrogenated block of a conjugated diene, the block copolymer being dispersed in the epoxy resin with an average particle size ranging from 0.05 to 0.20 microns.

Any of the epoxy resins known in the prior art to be useful in epoxy resin compositions which contain dispersed elastomeric polymers may be used in the epoxy resin composition of this invention, provided that the dispersed carboxylated polymer is not soluble in the epoxy resin. Suitable epoxy compounds include compounds containing, on average, two or more pendant or terminal 1,2-epoxy groups, i.e. vicinal epoxy groups, per molecule. Suitable epoxy compounds may be saturated or unsaturated, aliphatic, cycloaliphatic, aromatic or heterocyclic and may be substituted, if desired, with non-interfering substituents such as halogen atoms, hydroxyl groups, ether radicals and the like. Suitable epoxy compounds may also be liquid or solid at standard temperature and pressure. But normally liquid epoxy resins are preferred because normally solid epoxy resins are difficult to effectively blend with modified hydrogenated block copolymers.

Examples of useful epoxy resins include the polyglycidyl ethers of polyhydric alcohols and polyhydric phenols; polyglycidyl amines, polyglycidylamides, polyglycidylimides , polyglycidylhydantoins, polyglycidylthioethers, epoxidized fatty acids or drying oils, epoxidized polyolefins, epoxidized diunsaturated acid esters, epoxidized unsaturated polyesters, and mixtures thereof. Useful epoxy resins also include the epoxidized cycloolefins; as well as the polymeric polyepoxides which are polymers and copolymers of such monomers as glycidylacrylate, glycidylmethacrylate and allylglycidyl ether. Epoxy resins useful in the compositions of this invention may initially contain ethylenic unsaturation and may be slightly or partially crosslinked before use in the compositions of this invention. Epoxy resins useful in the epoxy resin composition of this invention are described, for example, in U.S. Pat. Nos. 3,804,735; 3,892,819; 3,948,698; 4,014,771; 4,119,609 and 4,786,668, which are incorporated herein by reference. Useful epoxy resins prepared from polyhydric phenols are described in such publications as U.S. Pat. No. 4,431,782, which is incorporated herein by reference. As indicated in this patent, epoxy resins can be prepared from mono-, di- and trihydric phenols and include the Novlac resins. Epoxy resins prepared with the phenols may, of course, be hydrogenated as taught in U.S. Pat. No. 3,336,241, which is incorporated herein by reference.

As is well known in the prior art, epoxy compounds and particularly those of the polymeric and prepolymer type, are frequently described in terms of epoxy equivalent values. The meaning of this expression is described in U.S. Pat. No. 2,633,458, which is incorporated herein by reference. In general, the epoxy compounds useful in the present invention will have epoxy equivalent values greater than 1. In general, the epoxy compounds useful in the epoxy resin compositions of this invention will have average molecular weights within the range from about 50 to about 10,000 and preferably within the range from about 150 to about 2000. The epoxy equivalent weights or weight per epoxide useful in this invention range from about 90 to about 2000 and preferably from about 150 to about 1000.

While the invention is applicable to epoxy compounds generally, preferred epoxy compounds are glycidyl polyethers of polyhydric phenols such as bisphenol A and bisphenol F. These epoxies are preferred due to commercial availability and low cost along with excellant properties. The polyepoxides are usually made by reacting at least 2 moles of an epihalohydrin or glycerol dihalohydrin with one or more moles of a polyhydric phenol or one or more moles of a polyhydric phenol condensation compound. The products are characterized by the presence of more than 1 epoxy group; i.e., a 1,2-epoxy equivalency greater than 1.

The epoxide compounds used in the epoxy resin compositions of this invention may contain a minor amount of a monoepoxide, such as butyl glycidyl ether, phenol glycidyl ether or cresol glycidyl ether as a reactive diluent. Such reactive diluents are commonly added to epoxide formulations to reduce the working viscosity thereof and to give better wetting to the formulation. As is known in the art, a monoepoxide affects the stoichiometry of the polyepoxide formulation and adjustments are made in the amount of curing agent and other parameters to reflect that change.

In general, any block copolymer comprising at least one polymeric block containing predominantly monoalkenyl aromatic hydrocarbon monomer units and at least one polymeric block containing, before hydrogenation, predominantly conjugated diolefin monomer units may be selectively hydrogenated, modified by incorporating one or more carboxylic acid groups selectively into the monoalkenyl aromatic blocks, and finely dispersed in the epoxy resin compositions of this invention.

The term "monoalkenyl aromatic hydrocarbon" particularly includes the vinyl aromatic compounds of the benzene series such as styrene and its analogs and homologs including alpha-methylstyrene and ring alkylated styrenes such as ring-methylated styrenes, and other vinyl polycyclic aromatic compounds such as vinyl naphthalene and the like. The preferred vinyl aromatics are styrene and alpha-methylstyrene, and styrene is particularly preferred.

The term "conjugated diene" preferably includes the compounds having from 4 to 8 carbon atoms. Examples of suitable such conjugated diene monomers include butadiene, isoprene, 2,3-dimethyl-1,3-butadiene, and piperylene, preferably butadiene and isoprene.

The average molecular weights of the individual blocks may vary within certain limits. In most instances, the vinyl aromatic blocks will have number average molecular weights in the order of about 1,000 to about 125,000, preferably about 1,000 to about 60,000, while the conjugated diene blocks either before or after hydrogenation will have number average molecular weights in the order of about 10,000 to about 450,000, preferably about 10,000 to about 150,000. These molecular weights are most accurately determined by gel permeation chromatography and/or low angle light scattering techniques.

Selective hydrogenation of the polymer may be accomplished using any of the methods known in the prior art. The hydrogenation will preferably be accomplished using a method such as those taught in U.S. Pat. Nos. 3,494,942; 3,634,549; 3,670,054; 3,700,633 and Re. 27,145, which are incorporated herein by reference. Most preferably, selective hydrogenation will be accomplished using one of the processes taught in U.S. Pat. No. 3,700,633. These hydrogenation processes involve the use of a suitable catalyst, particularly a catalyst or catalyst precursor comprising an iron group metal compound. In the methods described in the foregoing patents, the catalyst is prepared by combining an iron group metal, particularly a nickel or cobalt compound with a suitable reducing agent such as an aluminum alkyl. The preferred iron group metal compounds and the only specifically taught in these patents are carboxylates and alkoxides.

The block copolymer will be hydrogenated, preferably selectively hydrogenated, so as to convert (hydrogenate) at least about 80% of the ethylenic unsaturation initially contained therein, preferably at least 95% and most preferably at least 98%. Less than 10% of the initial aromatic unsaturation is hydrogenated, preferably less than about 5%, and most preferably less than 2%.

The incorporation of the functional group into the aromatic portion of the block copolymer may be accomplished by first metalating the base block copolymer in a manner such as that taught in U.S. Pat. 3,976,628, which is incorporated herein by reference. Functionalization of the polymer in this manner will, generally, be accomplished in a solution. Suitable solvents include straight- and branched-chain hydrocarbons such as pentane, hexane, heptane, octane and the like, as well as alkyl-substituted derivatives thereof; cycloaliphatic hydrocarbons such as cyclopentane, cyclohexane, cycloheptane and the like as well as alkyl-substituted derivatives thereof. Aromatic, substituted aromatics, and olefinic hydrocarbons are generally not acceptable as solvents because they will have a tendency to metalate along with the block copolymer. As indicated in U.S. Pat. No. 3,976,628, metalation of the polymer is, generally, accomplished with a metal alkyl such as s-butyllithium, and preferably in the presence of a polar metalation promoter. Although the metalation can take place without the presence of the polar metalation promoter, the reaction requires either extended time periods or excessive temperatures without the presence of the polar metalation promoter.

The polar metalation promoters include a variety of tertiary amines, bridgehead amines, ethers, and metal alkoxides. The tertiary amines useful in the metalation step have three saturated aliphatic hydrocarbon groups attached to each nitrogen and include, for example:

(a) Chelating tertiary diamines, preferably those of the formula $R_2N—(CH_2)_y—NR_2$ in which each R can be the same or different, straight- or branched-chain alkyl group of any chain length containing up to 20 carbon atoms, or more, all of which are included herein and y can be any whole number from 2 to 10, and particularly the ethylene diamines in which all alkyl substituents are the same. These include, for example: tetramethylethylenediamine, tetra-(mixed alkyl) ethylene diamines, and the like.

(b) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(c) The useful bridgehead diamines include, for example, sparteine, triethylenediamine and the like.

Tertiary monoamines such as triethylamine are generally not as effective in the lithiation reaction. However, bridgehead monoamines such as 1-aza(2,2,2)bicyclo-octane and its substituted homologs are effective.

Functionalization is then completed by reacting the metalated polymer with dry carbon dioxide. The reaction product of the metalated polymer and the dry carbon dioxide is a carboxylic acid salt. This reaction product is preferably converted to the acid form, because the lithium salt of carboxylic acid can catalyze polymerization of epoxy resins into polyepoxides. The lithium salt is converted to an acid by contacting the functionalized hydrogenated block copolymer with an acid. A most preferred acid is acetic acid due to its excellent solubility in acceptable solvents for the metalated block copolymer. Metalation followed by reaction with carbon dioxide may also be used to incorporate carboxylic acid functionality predominantly into the aromatic portion of the polymer using a method such as that taught in U.S. Pat. No. 4,145,298, which is incorporated herein by reference. In this method, substantially all of the ethylenic unsaturation is converted or saturated via hydrogenation before the polymer is metalated and reacted with a suitable electrophile such as carbon dioxide.

The modified block copolymer will be contained in the epoxy resin composition of this invention at a concentration within the range from about 1 part by weight to about 50 parts by weight per 100 parts by weight of epoxy resin plus modified block copolymer in the epoxy resin composition, preferably from about 5 part to about 25 parts by weight and most preferably from 5 to 20 parts by weight.

Any of the curing agents known to be effective for curing an epoxy resin composition may be optionally incorporated into the composition of this invention. As is well known, the curing agent actually selected can influence the cure rate, the exotherm encountered during curing and the resultant properties of the cured product. Preferably, an amount of curing agent within the range of 75% of stoichiometric to about 150% of stoichiometric will be used, more preferably an amount within the range of about 100% to about 125% of stoichiometric will be used, stoichiometric being one functional group of the curing agent per one epoxy group. More preferably a stoichiometric amount of curing agent will be used in the epoxy resin composition of this invention.

Suitable curing agents are hydrocarbon compounds containing nitrogen, sulfur or oxygen atoms. Suitable curing agents may be aliphatic, cycloaliphatic and aromatic and generally will contain a plurality of nitrogen, sulfur or oxygen atoms. Polyamines and polyamides are particularly effective curing agents. Suitable polyamines include ethylenediamine, diethylenetriamine, homologues thereof and the like, diaminocyclohexane and homologues thereof, sulfur substituted analogues thereof and the like, and aromatic polyamines such as diaminodiphenylsulfone and the like. Suitable polyamides include those derived from polymeric fatty acids and aliphatic polyamines such as taught in U.S. Pat. No. 2,450,940, which is incorporated herein by reference.

In addition to the essential components previously identified, the epoxy resin composition of this invention may contain other components such as fillers, reinforcement flakes or fibers, mats or webs, pigments, flame retardant agents, plasticiers, stabilizers, extenders, antioxidants, promoters, accelerators, thixotrophic agents and the like. The end use applications requiring one or more of these additional compounds are, or course, well known in the prior art and each such additional component will be used at concentrations well known to be effective for an intended purpose.

DESCRIPTION OF A PREFERRED EMBODIMENT

The most preferred method to prepare epoxy resin compositions within the present invention is emulsion blending of a diblock copolymer. In this most preferred method, an epoxy resin composition is prepared by emulsifying a block copolymer by addition of a polar solvent to a solution of the block copolymer in a less polar solvent. The diblock copolymer consists of one selectively carboxylated block of a monoalkenyl aromatic hydrocarbon connected to one selectively hydrogenated block of a conjugated diene. The diblock copolymer preferably has from 4% to 10% by polystyrene weight of carboxylate groups selected from acid groups, salt groups, ester groups, and combinations thereof, most preferably acid groups. The conjugated diene blocks precipitate first to form a core which is then surrounded by a shell of the monoalkenyl aromatic hydrocarbon blocks. Although various diblock copolymers may be precipitated in this manner, the presence of a carboxylated block of the monoalkenyl aromatic hydrocarbon is needed to prevent phase separation in epoxy compositions.

A preferred epoxy resin has the general formula:

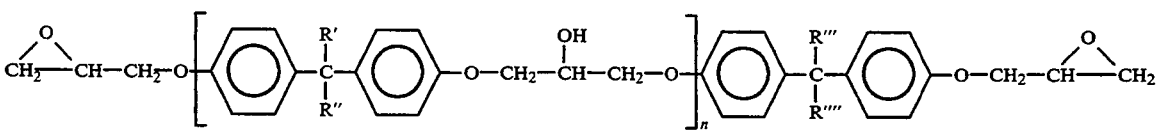

(I)

wherein n is a number from 0 to about 6, and R′, R″, R‴, and R⁗ are independently selected from the group consisting of hydrogen and $C_1$ to $C_5$ alkane radicals. Mixtures of epoxies which have an average value of n below 1 are most preferred. An epoxy mixture having an average n of about 0.2 is particularly preferred. Methyl, ethyl, isobutyl, and hydrogen are preferred as R′, R″, R‴, and R⁗, with methyl being most preferred.

The shell-core emulsion of the block copolymer is combined with an epoxy resin in an amount sufficient to toughen the epoxy resin. Removal of all solvents results in a stable dispersion of the shell-core particles in the epoxy resin.

The emulsion, or suspension, of the diblock copolymer is prepared by providing a solution of 2 to 15% by weight polymer in a suitable solvent, preferably tetrahydrofuran, and then adding a more polar solvent until a "milky solution" forms.

Preferred polar solvents include water and alcohols which are essentially non-solvents for the diblock copolymers. The amount of polar solvent added to form a shell-core precipitate depends on the particular polymer and solvents used, but is easily determined experimentally. For any given concentration of the diblock copolymer in solution, the polar solvent is added until the solution acquires a milky appearance. Excessive polar solvent will result in immediate precipitation of both the conjugated diolefin blocks and the monoalkenyl aromatic blocks which will result in excessive amount of non-shell-core particles, and the settling of polymer particles from the solvent system. Although Applicant is not bound by theory, Applicant believes that the milky suspension of the diblock copolymers consists of precipitated conjugated diolefin domains which are connected to solvent swollen domains of the monoalkenyl aromatic hydrocarbons. Additional polar solvent may then be added if needed to further precipitate the monoalkenyl aromatic hydrocarbon domains as the shell of a shell-core structure.

After the suspension of the functionalized block copolymer is formed, the epoxy resin is added. The solvents can be partially removed before the suspension is added to the epoxy resin, or alternatively, can remain until after the epoxy resin is added. Preferably the solvents are removed by vaporization after the epoxy resin is added.

The emulsion process of this invention produces epoxy compositions having a finely dispersed phase of the diblock copolymers wherein the dispersed particles have a narrow size distribution. The epoxy compositions have low viscosities and can be processed in epoxy molding equipment at higher concentrations than other dispersed elastomers.

The epoxy composition made by the process of this invention may be utilized in adhesive, coating, encapsulating electrical components, and molding applications.

EXAMPLES

Preparation of Modified Block Copolymers

For the following examples modified block copolymers were prepared by incorporating carboxyl functionality into the polymeric block containing predominately conjugated monoalkenyl aromatic hydrocarbon monomer units. The base copolymers modified to produce the modified block copolymers were diblock copolymers containing a single polystyrene block and a single hydrogenated polyisoprene block. For convenience, the block copolymers hereinafter will be referred to as base copolymer A and base copolymer B. Base copolymer A contains a polystyrene block having a weight average molecular weight of 39,000 and a polyisoprene block having a weight average molecular weight of 101,000. Base copolymer B contains a polystyrene block having a weight average molecular weight of 36,000 and a polyisoprene block having a weight average molecular weight of 59,000.

All of the modified block copolymers were prepared by first metallating the polymer, thereafter reacting the metallated polymer with carbon dioxide. Some of the modified block copolymers were coagulated in excess methanol at this time and then dried. These modified block copolymers contained 100% carboxylate salt functionality. The rest of the modified block copolymers were contacted with a sufficient amount of acetic acid to convert a controlled amount of the salt groups resulting from the reaction of the metallated polymer with $CO_2$ to the corresponding acid group. Prior to metallating of the base block copolymers, however, both were hydrogenated so as to convert (saturate) about 98 percent of the ethylenic unsaturation initially contained therein. The carboxyl functionality was, then, incorporated at least substantially completely into the aromatic portion of the polymer.

All of the modified block copolymers prepared in this example were prepared by first contacting a solution of the base copolymer with sec-butyl lithium in the presence of tetramethyl ethylene diamine (TMEDA) at a temperature of 80° C. In preparing all of the modified block copolymers, cyclohexane was used as the solvent and the polymer was contained in solution at a concentration of between five (5) and ten (10) weight percent based on total solution, during the metallation step. For convenience, the modified block copolymers hereinafter will be referred to modified block copolymer C-K and specific information about each modified block copolymer is given in Table 1.

TABLE 1

| Modified Block Copolymer | Base Block Copolymer | % w COOH | Acid/Salt Ratio |
|---|---|---|---|
| C | A | 1.3 | 100/0 |
| D | A | 1.3 | 0/100 |
| E | A | 3.8 | 0/100 |
| F | A | 0.66 | 0/100 |
| G | B | 1.51 | 100/0 |
| H | B | 1.9 | 100/0 |
| I | B | 2.6 | 100/0 |
| J | B | 2.6 | 0/100 |
| K | B | 2.7 | 100/0 |

EXAMPLE 1

Epoxy resin compositions having improved properties have been prepared by two processes that include emulsifying the modified block copolymer. The processes are exemplified by the following description.

Modified block copolymer C was dissolved in 25 milliliters (mls) of tetrahydrofuran (THF) to a concentration of 10 percent by weight. Water was added to this solution in 0.2 ml aloquots as the solution was stirred. As the water was added the viscosity of the solution increased to the point of formation of a gel. Upon further water addition the gel broke and a milky, low viscosity solution was formed. The total water added was 2.6 mls. This milky solution (emulsion) was then added to a bisphenol A glycidyl ether polyepoxide having the formula set forth in the preferred embodiment section of this application wherein R′, R″, R‴, and R⁗ are methyl groups and n=0.2. The solution was added such that the final modified epoxy resin composition would contain 5 percent by weight modified block copolymer. The solution was added to the epoxy resin while stirring the resin. The total mixture was then allowed to stir for 1–2 days to slowly evaporate the THF and water. Finally, the epoxy resin/rubber mixture was vacuum dried/degassed at 125° C. for 15–30 minutes to remove any remaining solvent. This approach will be hereinafter referred to as the "dilute emulsion" (EMDIL) approach.

A similarly formed milky solution (emulsion) was prepared with modified block copolymer C. Prior to addition of the emulsion to the epoxy resin, the emulsion was allowed to concentrate by slow evaporation of the solvents (THF/water) for 3 days at room temperature while stirring to a concentration of 20 percent by weight polymer. This concentrated emulsion was then added to the same epoxy resin as above. The emulsion-/epoxy resin mixture was stirred for 15–30 minutes and then degassed under vacuum at 125° C. for another 15–30 minutes to remove the remaining solvent. This approach will be hereinafter referred to as the "concentrated emulsion" (EMCONC) approach.

EXAMPLE 2

Modified block copolymer K was dissolved in 80 mls of THF to a concentration of 10.1 percent by weight. This solution was then split into four 20 mls samples solution (SS1–4). To SS1 and SS2 was added water in 0.1 ml aloquots. The solution formed a gel which subsequently broke to give a milky, low viscosity gel which subsequently broke to give a milky, low viscosity solution in both cases. The total amount of added water was 5.5 mls. To SS2 further amounts of water was added in 0.1 ml aloquots. The solution remained milky and free of any polymer precipitate until approximately 6.7 mls of water had been added. At this point, the polymer began to be coagulated from the solution.

To SS3 was added methanol as the polar solvent. The methanol was added in 0.1 aloquots. Again as the methanol was added a gel was formed and upon further addition of methanol the gel broke and a milky, low viscosity solution was formed. The total amount of methanol added was 25 mls. To SS4 was added ethanol as the polar solvent. The ethanol was added in 0.1 mls aloquots. With addition of the ethanol a gel was formed and subsequently broke as further amounts of ethanol were added. Once the gel broke a milky, low viscosity solution was obtained. The total ethanol added was 50 mls.

It can be seen that as the polarity of the polar solvent decreases more polar solvent is needed to obtain the desired milky, low viscosity solution (emulsion). The addition of a solvent having lower polarity results in increased total solvent use, increased solvent evaporation time, and a lower polymer concentration in the final emulsion prior to addition to the epoxy resin.

All of the sample solutions were then added to the epoxy resin used in Example 1. After solvent evaporation, it could be seen that all of the modified epoxy resin mixtures except for the one prepared from excess polar solvent (SS2), were smooth and contained no visible phase separation of the epoxy resin and the modified block copolymer. For the mixture made with excess polar solvent (SS2), large agglomerations of modified block copolymer were visible.

EXAMPLE 3

Modified block copolymer I was dissolved in two separate bottles of 10 mls of THF to concentrations of 5 and 10 percent by weight. Water was added to the solutions in 0.1 mls aloquots. As the water was added the viscosity of both solutions increased, however, only the 10 percent by weight polymer containing solution formed a gel. Further, water was added and the gel broke in the solution. For both solutions the viscosity decreased with further water addition and a milky, low viscosity solution was formed. The total amount of water added in each bottle was 3.0 and 1.7 mls, respectively.

Modified block copolymer I was then dissolved in three separate bottles of 100 mls of THF to a concentration of 10 percent by weight. The three solutions will hereinafter be referred to as B1–3. Water was added to B1, whereas to B2 and B3 a solution of water with 9 percent by weight lithium hydroxide (LiOH) was added. Each of the polar solvents were added in 0.2 ml aloquots. As the polar solvents were added, the solution formed gel and subsequently the gel broke to give a milky, low viscosity solution (emulsion). For B1 this occurred with 24 mls of water added. For B2 and B3 the emulsion formed with only 4 mls of LiOH/water added. To B3 was added additional LiOH/water solution, at approximately 8 mls of total LiOH/water added a precipitate was observed. These emulsions were then added to the above described epoxy resin in order to form 5 percent by weight modified block copolymer containing epoxy resin compositions as described above. The modified epoxy resin composition prepared from the B3 emulsion showed visual signs of phase separation of the modified block copolymer from the epoxy resin. The other epoxy resin compositions were smooth and free of any visual inhomogeneities.

EXAMPLES 4

Modified block copolymers C and D were both dissolved in separate bottles of 20 mls of THF, each at a concentration of 10 percent by weight. Water was added to both solutions in 0.2 ml aloquots. As the water was added, both solutions formed gels which with additional amounts of water broke to give milky, low viscosity solutions (emulsions). The total amount of water added was 6.2 and 5.2 mls for modified block copolymers C and D, respectively. The modified block copolymer in the carboxylate salt form tends to need less of the polar solvent to reach the emulsion state. Each of these solutions were added to the above described epoxy resin to give, after evaporation of the solvents, 5 percent by weight modified block copolymer/epoxy resin compositions. Both of the epoxy resin compositions were smooth with no visible signs of polymer agglomeration.

EXAMPLE 5

Modified block copolymers E and F were obtained from the metallation process prior to coagulation of the polymer in 3.9 percent by weight cyclohexane solutions. To each of these solutions water was added in 0.05 ml aloquots. With the addition of water both solutions showed reduced viscosity and formed milky solutions. The total amount of water added was 4.9 and 0.9 mls for modified block copolymer E and F, respectively. These solutions were then added to the epoxy resin of Example 1. However, upon addition of each solution to the epoxy resin the cyclohexane solution was found to be insoluble with the epoxy resin. This insolubility caused coagulation in the solution of the modified block copolymers. It is believed that the initial solvent for the modified block copolymer must be soluble with the epoxy resin as well to be able to transfer the emulsion from the solvent to the epoxy resin without agglomeration of the polymer.

EXAMPLE 6

Modified block copolymers G, H, I and K were dissolved into four separate bottles of 20 mls of THF, each at a concentration of 10 percent by weight. The four bottle solutions hereinafter will be referred to as BS1–4, respectively. Water was added as the polar solvent in 0.2 ml aloquots. As water was added each of the solutions formed a gel which subsequently broke upon further addition of water. The resulting solutions (emulsions) had a milky appearance and were of low viscosity. The total amount of water needed for each solution was 1.8, 2.4, 3.4 and 3.7 mls, respectively.

Each solution was then added to the previously described epoxy resin. After addition of BS1 to the epoxy resin and during evaporation of the solvent a precipitate appeared at the top of the sample bottle. After all of the solvent had been evaporated and the sample degassed, the modified epoxy resin composition containing BSI showed visual signs of polymer agglomeration. The epoxy resin compositions containing BS2 through BS4 showed no signs of agglomeration and their respective modified epoxy resin compositions had a smooth texture with no visual signs of agglomeration. This indicates that a certain level of carboxylic functionality, greater than 35 carboxylic sites per block copolymer, results in significantly improved morphology in comparison to lower levels of functionality.

EXAMPLE 7

In this example, five epoxy resin compositions were prepared. Each of the epoxy resins were prepared with the previously described polyepoxide. The two comparative compositions were prepared by dissolving the epoxy resin in THF at 30 percent by weight, and dissolving base block copolymer A and modified block copolymer D in THF at 10 percent by weight. The block copolymer solutions were then added to the epoxy resin solutions and subsequently the THF was allowed to evaporate while stirring over a period of two days. The samples were then placed in a vacuum oven at 125° C. for 15 minutes to degas and remove any remaining solvent.

Two EMDIL modified epoxy resin compositions were also prepared using base block copolymer A and modified block copolymer D via the EMDIL approach described in Example 1. The modified epoxy resin composition containing the base block copolymer A showed visual signs of polymer agglomeration. To each of epoxy compositions a stoichiometry amount of an equal molar blend of diaminodiphenylmethane and diaminotoluene was added as a curing agent. The blends were then degassed again, poured into glass molds to form plaques, and cured by heating for 4 hours at 80° C. followed by two hours at 150° C. The cured plaques were then machined in order to obtain sample bars suitable for determining the fracture toughness (Kq) of the cured composition and the dry flexural modulus of the cured composition. For comparison purposes, the neat epoxy resin was also blended with the curing agent in a stoichiometry amount and cured via the above described procedure. The same set of physical properties were also determined for this control as reported in Table 2.

TABLE 2

| Modified Composition | % w Block Copolymer | Kq (psi/in) | Tg (C.) | Flex Mod (Mpsi) | Visual Separation |
|---|---|---|---|---|---|
| Polyepoxide | — | 627 | 179 | 408 | — |
| Sol'n Polyepoxide/ Block Copolymer A | 5 | 768 | 141 | 338 | Yes |
| Sol'n Polyepoxide/ Block Copolymer D | 5 | — | 101 | — | No |
| EMDIL Polyepoxide/ Block Copolymer A | 5 | — | — | — | Yes |
| EMDIL Polyepoxide/ Block Copolymer D | 5 | 1231 | 124 | 373 | No |

The epoxy resin composition prepared from the emulsified modified block copolymer D shows the best balance of Tg and toughness without any signs of separation. The rubber particles in this composition were found to be uniformly 0.07 microns in size via transmission electron microscopy of a cryogenically microtomed sample.

EXAMPLE 8

In this example, two modified epoxy resin compositions were prepared. Each of the epoxy resin compositions were prepared with the same polyepoxide as used in Example 7. Modified block copolymer J was dissolved in THF and formed into an emulsion by addition of water as described in Example 1. This emulsion was then split into two equal amounts. One sample was concentrated prior to addition to the epoxy resin as described in Example 1 as the EMCONC approach. The other sample was added directly to the epoxy resin as described in Example 1 as the EMDIL approach. To each modified epoxy resin composition was a stoichiometry amount of diaminodiphenylenesulfone was added as a curing agent. The compositions were degassed, formed into plaques, and cured via a schedule of 5 hours at 150° C. followed by 1 hour at 200° C. For comparative purposes, the neat epoxy resin was blended with the same curing agent and prepared via the same curing schedule. The same set of properties as described in Example 3 were run on these compositions and are reported in Table 3.

TABLE 3

| Modified Composition | % w | Kq (psi/in) | Tg (C.) | Flex Mod (Mpsi) | Visual Separation |
|---|---|---|---|---|---|
| Polyepoxide | — | 595 | 196 | 475 | — |
| EMCONC Polyepoxide/ Block Copolymer J | 5 | 1132 | 172 | 393 | No |
| EMDIL Polyepoxide/ Block Copolymer J | 5 | 968 | 174 | 384 | No |

The EMCONC prepared modified epoxy resin composition shows a better balance of properties, however the procedure for preparation of the EMCONC modified epoxy resin is more time consuming and difficult to control than the EMDIL approach. Both samples as determined by microscopy have rubber particles on the order of 0.07 microns in size.

EXAMPLE 9

In this example, two of the modified epoxy resin compositions prepared in Example 6 were used. To the modified epoxy resin compositions prepared from BS2 and BS3 of Example 6 were added a stoiohometry amount of diaminodiphenylenesulfone as a curing agent. For comparative purposes, to the neat epoxy resin was added a stoichiometry amount of the curing agent. The same procedure and curing schedule as described in Example 8 were used. The same properties were determined on the cured plaques from these compositions as had been done in Example 7. The data is presented in Table 4.

TABLE 4

| Midified Composition | % w BC | Kq (psi/in) | Tg (C.) | Flex Mod (Mpsi) | Visual Separation |
|---|---|---|---|---|---|
| Polyepoxide | — | 595 | 196 | 475 | — |
| EMDIL Polyepoxide/ | 5 | 631 | 178 | 430 | No |

TABLE 4-continued

| Midified Composition | % w BC | Kq (psi/in) | Tg (C.) | Flex Mod (Mpsi) | Visual Separation |
|---|---|---|---|---|---|
| Block Copolymer H | | | | | |
| EMDIL Polyepoxide/ Block Copolymer I | 5 | 944 | 201 | 385 | No |

It can be noted from Table 4 that modified block copolymer H does not result in as improved a fracture toughness value as does modified block copolymer I. Microscopic investigation showed that the epoxy resin composition containing modified block copolymer H contained some rubber particle agglomeration which could not be seen visually. It is felt that the level of COOH functionality attached to modified block copolymer H (1.9%) is most preferred for emulsion preparation and transfer to the epoxy resin. Lower levels of functionality, as shown for modified block copolymers C, D, F, and G are not preferred.

EXAMPLE 10

In this example, four epoxy resin compositions were prepared. All of the epoxy resin compositions were prepared using the previously described polyepoxide. Two of the modified epoxy resin compositions were prepared using EMCONC solutions of modified block copolymers C and D. To these modified epoxy resin compositions were added diaminodiphenylenesulfone (DDS) as a curing agent. These compositions, along with a neat epoxy resin control, were prepared and cured via the procedure given in Example 8. Two other modified epoxy compositions were prepared using EMDIL solutions of modified block copolymers I and J. To these modified epoxy resin compositions was added as a curing agent a equal molar blend of diaminodiphenylmethane and diaminotoluene (DAT). These compositions, along with a neat epoxy resin control, were prepared and cured via the procedure given in Example 7. The results of comparative testing is presented in Table 5.

TABLE 5

| Modified Composition | Curing Agent | % w BC | Kq (psi/in) | Tg (C.) | Flex Mod (Mpsi) |
|---|---|---|---|---|---|
| Polyepoxide | DDS | — | 595 | 196 | 475 |
| EMCONC Polyepoxide/ Block Copolymer C | DDS | 5 | 827 | 206 | 390 |
| EMCONC Polyepoxide/ Block Copolymer D | DDS | 5 | 786 | 181 | 370 |
| Polyepoxide | DAT | — | 749 | 179 | 408 |
| EMDIL Polyepoxide/ Block Copolymer I | DAT | — | 860 | 185 | 403 |
| EMDIL Polyoxide/ Block Copolymer J | DAT | 5 | 1013 | 142 | 374 |

It can be noted from Table 5 that the modified block copolymers with carboxylate salt functionality tend to have depressed Tg and flexural modulus values. It is believed that the metal salts may also effect the cure rate in some epoxy/curing agent systems. It is also felt that the presence of metal salts in some application uses may be detrimental, such as electronic encapsulation.

EXAMPLE 11

In this example, four modified epoxy resin compositions were prepared. The epoxy resin used in the example is the same as has been described in previous examples. A concentrated emulsion (EMCONC) of modified block copolymer I in THF/water was prepared via the technique described in Example 1. This EMCONC was then split into four equal portions. Each portion was added to the neat epoxy resin while it was being stirred. The amount of each portion of EMCONC added to the epoxy resin was controlled such that a 5, 10, 15 and 20 percent by weight concentration of modified block copolymer would be present within the epoxy resin compositions after full evaporation of the solvents. Each of the modified epoxy resin compositions showed no signs of inhomogeneities after solvent evaporation.

To each modified epoxy resin composition was then added a stoichiometry amount of an equal molar blend of diaminodiphenylmethane and diaminotoluene. Each modified epoxy resin composition was then cured via the procedure and cure schedule given in Example 4. A sample of each modified epoxy resin composition was then microtomed and investigated via transmission electron microscopy in order to determine the rubber particle size in each composition. It was found that in all modified epoxy resin compositions that the modified block copolymer was dispersed as 0.07 micron particles. This indicates that the amount of modified block copolymer in each modified epoxy resin composition does not affect the rubber particle size.

We claim:

1. A process to prepare an epoxy resin composition comprising the steps of:

emulsifying a block copolymer from a solvent solution by addition of a more polar solvent, the block copolymer comprising at least one block of a monalkenyl aromatic hydrocarbon connected to at least one selectively hydrogenated block of a conjugated diene wherein the block copolymer is modified by incorporating one or more carboxylic acid groups selectively into the mon-alkenyl aromatic blocks; and combining the block copolymer with an epoxy resin.

2. The process of claim 1 wherein the block copolymer is emulsified from tetrahydrofuran and the polar solvent is water or an alcohol.

3. The process of claim 1 wherein the block copolymer consists of one selectively carboxylated block of styrene and one selectively hydrogenated block of isoprene.

4. A process to prepare an epoxy resin composition, comprising the steps of:

emulsifying a block copolymer by addition of a polar solvent to a solution of the block copolymer in a less polar solvent, the block copolymer consisting of one selectively carboxylated block of a monoalkenyl aromatic hydrocarbon connected to one selectively hydrogenated block of a conjugated diene wherein the block copolymer is modified by incorporating one or more carboxylic acid groups selectively into the monoalkenyl aromatic blocks; and combining the emulsion of the block copolymer with an epoxy resin, wherein the selectively carboxylated block of the block copolymer has sufficient acid groups to prevent agglomeration of the block copolymer in the epoxy resin composition.

5. The process of claim 4 further comprising the step of removing all solvents from the epoxy resin composition to form a solvent-free epoxy resin composition.

6. The process of claim 4 wherein the block copolymer is a carboxylated polystyrene-hydrogenated polyisoprene diblock copolymer having from 4.0 to 10.0 percent by polystyrene weight of acid groups selectively grafted to the polystyrene block.

7. The process of claim 4 wherein the epoxy resin is a polyglycidyl ether of bisphenol A.

8. The process of claim 4 wherein the epoxy resin is a polyglycidyl ether of bisphenol F.

* * * * *